United States Patent
Grady et al.

(10) Patent No.: US 8,543,470 B2
(45) Date of Patent: *Sep. 24, 2013

(54) SYSTEM AND METHOD FOR TARGETING LIMITED-TIME OFFER BASED ON LIKELIHOOD OF ACCEPTANCE AND SELECTING TRANSMISSION MEDIA BASED ON CUSTOMER INTEREST

(75) Inventors: Patrick Grady, San Francisco, CA (US); Mark Orttung, Menlo Park, CA (US)

(73) Assignee: Rearden Commerce, Inc., Foster City, CA (US)

(*) Notice: Subject to any disclaimer, the term of this patent is extended or adjusted under 35 U.S.C. 154(b) by 1007 days.

This patent is subject to a terminal disclaimer.

(21) Appl. No.: 12/573,844

(22) Filed: Oct. 5, 2009

(65) Prior Publication Data

US 2010/0023407 A1    Jan. 28, 2010

Related U.S. Application Data

(63) Continuation of application No. 10/869,356, filed on Jun. 15, 2004, now Pat. No. 7,599,858.

(51) Int. Cl.
*G06Q 30/00* (2012.01)

(52) U.S. Cl.
USPC ........................................ 705/26.4; 705/14.66

(58) Field of Classification Search
USPC .................................................. 705/26–27.2
See application file for complete search history.

(56) References Cited

U.S. PATENT DOCUMENTS

| | | | |
|---|---|---|---|
| 6,049,778 | A | 4/2000 | Walker et al. |
| 6,587,835 | B1 | 7/2003 | Treyz et al. |
| 7,284,033 | B2 | 10/2007 | Jhanji |
| 7,343,317 | B2 | 3/2008 | Jokinen et al. |
| 7,506,805 | B1 | 3/2009 | Chakravarthy |
| 7,603,291 | B2 | 10/2009 | Raiyani et al. |
| 7,681,786 | B1 | 3/2010 | Chakravarthy |
| 7,706,808 | B1 | 4/2010 | Aggarwal et al. |
| 7,742,954 | B1 | 6/2010 | Handel |
| 7,806,328 | B2 | 10/2010 | Chakravarthy |
| 7,925,540 | B1 | 4/2011 | Orttung |
| 7,970,666 | B1 | 6/2011 | Handel et al. |
| 8,055,534 | B2 | 11/2011 | Ashby et al. |
| 2002/0095333 | A1 | 7/2002 | Jokinen et al. |
| 2002/0099613 | A1* | 7/2002 | Swart et al. ............. 705/26 |
| 2003/0097302 | A1 | 5/2003 | Overhultz et al. |
| 2003/0132298 | A1 | 7/2003 | Swartz et al. |
| 2003/0154125 | A1* | 8/2003 | Mittal et al. ............. 705/14 |
| 2003/0194065 | A1 | 10/2003 | Langseth et al. |
| 2004/0181461 | A1 | 9/2004 | Raiyani et al. |

(Continued)

OTHER PUBLICATIONS

Restaurant row selects serveclick from connectria to power its advanced online restaurant "e-scheduling". Business Wire. New York: Feb. 1, 2000.*

*Primary Examiner* — Adam Levine
(74) *Attorney, Agent, or Firm* — Greenberg Traurig, LLP

(57) ABSTRACT

System and method for availability based on limited-time offerings and transactions. One embodiment of the present invention provides a system and method that, based on a set of known preferences and historic transactions with customers, culls from a customer database those customers most likely to close a transaction in a short time. The selected customers are notified of the offer, and the system processes the customers responses in a timely manner, and thus allow fleeting inventories to be sold off before they expire.

39 Claims, 2 Drawing Sheets

(56) References Cited

U.S. PATENT DOCUMENTS

| | | |
|---|---|---|
| 2005/0010472 A1* | 1/2005 | Quatse et al. .............. 705/14 |
| 2005/0014558 A1 | 1/2005 | Estey |
| 2005/0039136 A1 | 2/2005 | Othmer |
| 2005/0040230 A1 | 2/2005 | Swartz et al. |
| 2005/0154736 A1 | 7/2005 | Meikleham et al. |
| 2006/0085276 A1 | 4/2006 | Hoech et al. |
| 2006/0090185 A1 | 4/2006 | Zito et al. |
| 2006/0173747 A1 | 8/2006 | Gantman et al. |
| 2009/0112639 A1 | 4/2009 | Robinson |
| 2009/0210261 A1 | 8/2009 | Mortimore, Jr. |
| 2009/0248457 A1 | 10/2009 | Munter |
| 2010/0161392 A1 | 6/2010 | Ashby et al. |
| 2011/0004497 A1 | 1/2011 | Mortimore, Jr. et al. |

* cited by examiner

SYSTEM AND METHOD FOR TARGETING LIMITED-TIME OFFER BASED ON LIKELIHOOD OF ACCEPTANCE AND SELECTING TRANSMISSION MEDIA BASED ON CUSTOMER INTEREST

CROSS-REFERENCE TO RELATED APPLICATIONS

The present application is a continuation application of U.S. patent application Ser. No. 10/869,356, filed Jun. 15, 2004, now U.S. Pat. No. 7,599,858, the disclosure of which is incorporated herein by reference in its entirety.

FIELD OF THE INVENTION

This invention relates generally to the offering of products and services, and more particularly to the offering of products and services available based on limited time offerings.

COPYRIGHT NOTICE/PERMISSION

A portion of the disclosure of this patent document contains material, which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2001, Gazoo, Inc., All Rights Reserved.

BACKGROUND

Many products and services have only a limited time of usability. For example, if there are vacant seats on an airplane flight, when the flight takes off, the usability of (and the revenue from) these seats is lost. As another example, the usability of (and the revenue from) a hotel room is lost if the room remains unoccupied overnight. A third example would be a table at a popular restaurant. As a lunch hour or evening passes, the revenue and value from an unused table is lost. Many people might be interested in taking advantage of such opportunities at the last minute if the price is low enough, if the service is convenient enough, or if the service is particularly scarce, but they may not have the opportunity, the interest, or the time to search an auction site for such products and services.

What is needed is a system and method that, based on a set of known preferences and historic transactions with customers, could cull from a customer database the customers most likely to close a transaction, and thus allow fleeting inventories to be sold off before they expire and allow customers to get access to extremely convenient, highly sought after, or well priced services.

SUMMARY

One embodiment of the present invention provides a system and method that, based on a set of known preferences and historic transactions with customers, culls from a customer database those customers most likely to close a transaction in a short time. The selected customers are notified of the offer, and the system processes the customers responses in a timely manner, and thus allow fleeting inventories to be sold off before they expire.

BRIEF DESCRIPTION OF THE FIGURES

The invention is illustrated by way of example and not limitation in the figures of the accompanying drawings, in which like references indicate similar or identical elements, and in which.

DETAILED DESCRIPTION

In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" indicate that a particular feature, structure, or characteristic described in connection with the embodiment is included in at least one embodiment of the invention. The appearances of the phrase "in one embodiment" in various places in the specification are not necessarily all referring to the same embodiment.

Figure 1:
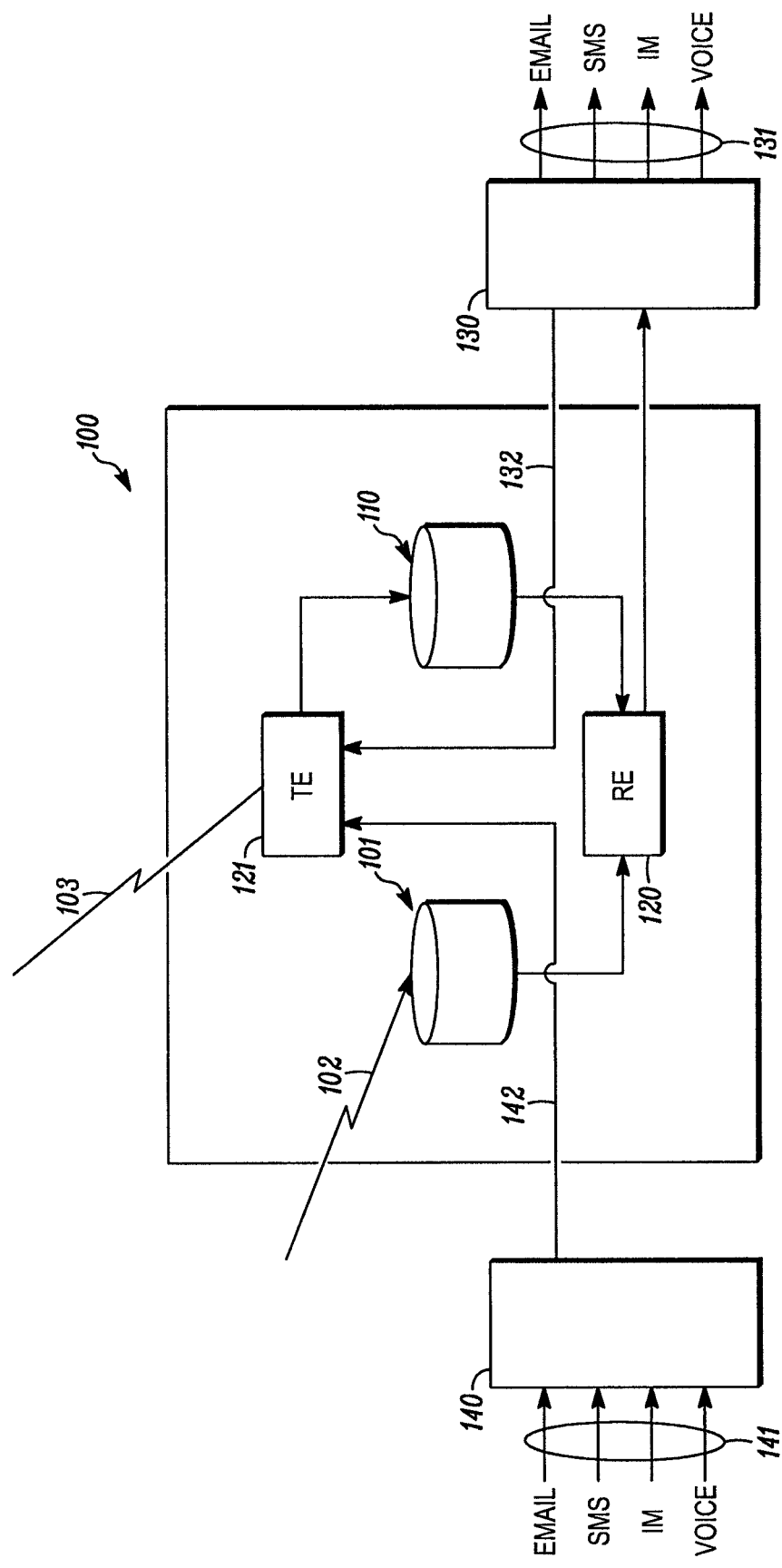
FIG. 1 is a diagram illustrating a system-level overview of an embodiment of the invention.

FIG. 1 illustrates a limited-time availability-based transaction system 100, in accordance with one embodiment. The system includes a customer database 110 that may include a variety of data about customers. The database may include (but is not limited to) personal information (e.g., name, address, etc.), declared preferences (e.g., type of restaurant, service levels, price ranges, etc.), calendar information (e.g., information on the customer's availability and location at different dates and times). The database may also include current variables (e.g., current location determined by technological devices such as a global positioning system in their car or the e911 information from their cell phone, current financial status, etc.) The current variables may also include information gleaned from purchases, such as a recently booked airline ticket that tells the system the customer is likely to be at the ticket's destination, and previous purchase information, such as specific reservations made for services and current purchase status. In another example, the system would know restaurants a customer has visited (for both business and pleasure).

In one embodiment, for a given transaction, the system 100 would be able to generalize preferences from the specifics. For example, if the person has reserved tables at restaurants in a given price range for business consistently, the system would conclude that the person prefers that price range for business meals. In some cases, based on such data, the system 100 may reconcile the differences between "do as I say" (stated preferences) and "do as I do" (customer history).

In one embodiment, database 101 contains offers that come in real time over connection 102 from promotion partners, for example such as hotels, airlines, flower shops, etc. The types of services and/or products that can be made available is nearly unlimited, but the system 100, in one embodiment, is applicable to products and/or services that have an expiration deadline after which in most cases they are no longer suitable, valuable or available for consumption. The offers may even include merchandise such as groceries, etc., and are not limited to traditionally considered products, such as airline seats and hotel rooms. The offers may include occasion driven things, such as for example birthday gifts, surprise parties, anniversary trips etc. (the product may not expire, but the occasion may be missed). The offers may also include services originally scheduled for a later date or time (due to availability constraints at the time of booking the service) which have become available. Examples of this type include appliance repair technicians or an appointment for automobile repair service.

The features/information about availability of the service or product of the offer may include date, time, and location, and price. For example, a table at a sought after restaurant or an appointment at a difficult-to-book spa or hair salon may become available. The service/product may become available at the last minute at a discounted rate. As an example, the restaurant may choose to offer its menu at a significant discount if they have not received as many reservations as hoped for the next day. In an other example, a business man traveling to New York may get an offer for a table at a sought after restaurant in NYC for his night there, matching the type and price range of a similar one he visited on his last trip to NYC.

In one embodiment, the system 100 further includes a rules engine 120, which follows a set of prepared rules to combine the availability information about an offer (inventory, price, location, etc.) with customers whose information is in the database. In one embodiment, a ranking system is used to select a suitable set of customers for each offer. Criteria in the ranking system may include one or more of the following examples: likelihood of the offer being accepted by particular customer, loyalty bonus ("we owe them the offer"), previous dollars spent by a customer, loyalty points accrued by a customer, etc. Additional criteria may also be considered.

In one embodiment, the rules engine might take into account preferences the customer has set for receiving offers, the time of day, the consumer's previous acceptance rate for similar offers, how quickly the customer responded to previous offers, and other factors. The rules are geared toward serving the consumer's best interests, as the customer otherwise might lose interest in receiving future offers.

After processing by the rules engine 120, the rules engine then transmits the offers to an output channel 130, which transmits the offers via at least one of various notification media 131, such as email, short message service (SMS), instant messaging (IM), and voice call or message (shown in FIG. 1 as examples). Additional media may also be used, such as chat, notes, personalized TV ads, web site ads, to name just a few.

In one embodiment, the offers are good for a limited time, such as the next five minutes, the next half-hour, the next hour, etc. Depending on the required purchase cost and the nature of the product or service, the time the product/service is available could be even several days. For example, an offer for an expensive cruise could be extended for several days to weeks, but a less costly product/service such as a last-minute weekend getaway or the last bunch of roses to be delivered, might only be extendable for five minutes etc.

In one embodiment, an offered product/service may be offered as "guaranteed availability", indicating that the offer is only made available to the number of consumers for which inventory can be guaranteed. In this case, the system 100 manages the guaranteed offer process. In one embodiment, the fact that the offer is categorized as a guaranteed availability offer may affect how the customers are ranked, or selected to receive the offer. For example, customers who respond quickly may be ranked higher relative to other potential customers. In one embodiment, the system would offer the service to the highest scoring customer (or customers if multiple customers can be guaranteed inventory). As soon as one or more of the offers expire or the consumer rejects the offer, the system would offer the service to the next highest ranked customer.

In some cases, the user may respond directly in real time. For example, in the case of voice transmission, the user may answer the phone. The user's responses to the voice message are transmitted via link 132 into the transaction engine 121, which then processes the transaction and sends the processed transaction over link 103 to the appropriate promotion partner. Other communication media or responses that are not real time may be received by channel response unit 140 from the various channels 141 and be transported via link 142 into transaction engine 121. It is clear that a wide variety of technologies may be used to implement this communication, without departing from the spirit of the present invention.

It is further clear that in most cases 140 and 130 will be one system, such as a contact center infrastructure or similar, or a dedicated communication box that can do both outgoing and incoming communication at the same time. Well known systems, such as IVR, VoiceXML, e-mail, chat, SMS etc. may also be used, separately or in conjunction, and may be augmented with call center or contact center to offer live human interaction, as is well known in the art. Also, links 102 and 103 for receiving and transmitting information between the promotion partners and the system may be the same, or may be one link for each promotion partner, or may be a variety of links to promotion partner exchanges offering last-minute products and services.

In one embodiment, the ability of the system to consider the good of the customers is considered. For example, while potential customers may be ranked for receiving offers, it may be likely that an established system would very quickly get to a state where customers are barraged with many more offers than they want to look at. Thus, when the system receives multiple offers from multiple promotion partners for a single customer, in one embodiment, the system 100 may rank the offers based on the customer's interests, both stated and implied by past transactions (similar to the way the system ranks the customers based on the supplier's interests, not shown).

The system could then reject some offers automatically without sending them to the customer. The system might also rank how the offers are presented to the customer. For example, offers over a given threshold might warrant a phone call to the customer, offers lower than that threshold but higher than a lower threshold might warrant an email, and offers with a score lower than the lower of the two thresholds might be automatically rejected. In a simple situation, the user, for example, may limit the number of offers per hour or per day. In other examples, like intelligent spam filters, the user may instead of just rejecting offers, block offers of specific kind, vendor or time of day etc.

Figure 2:
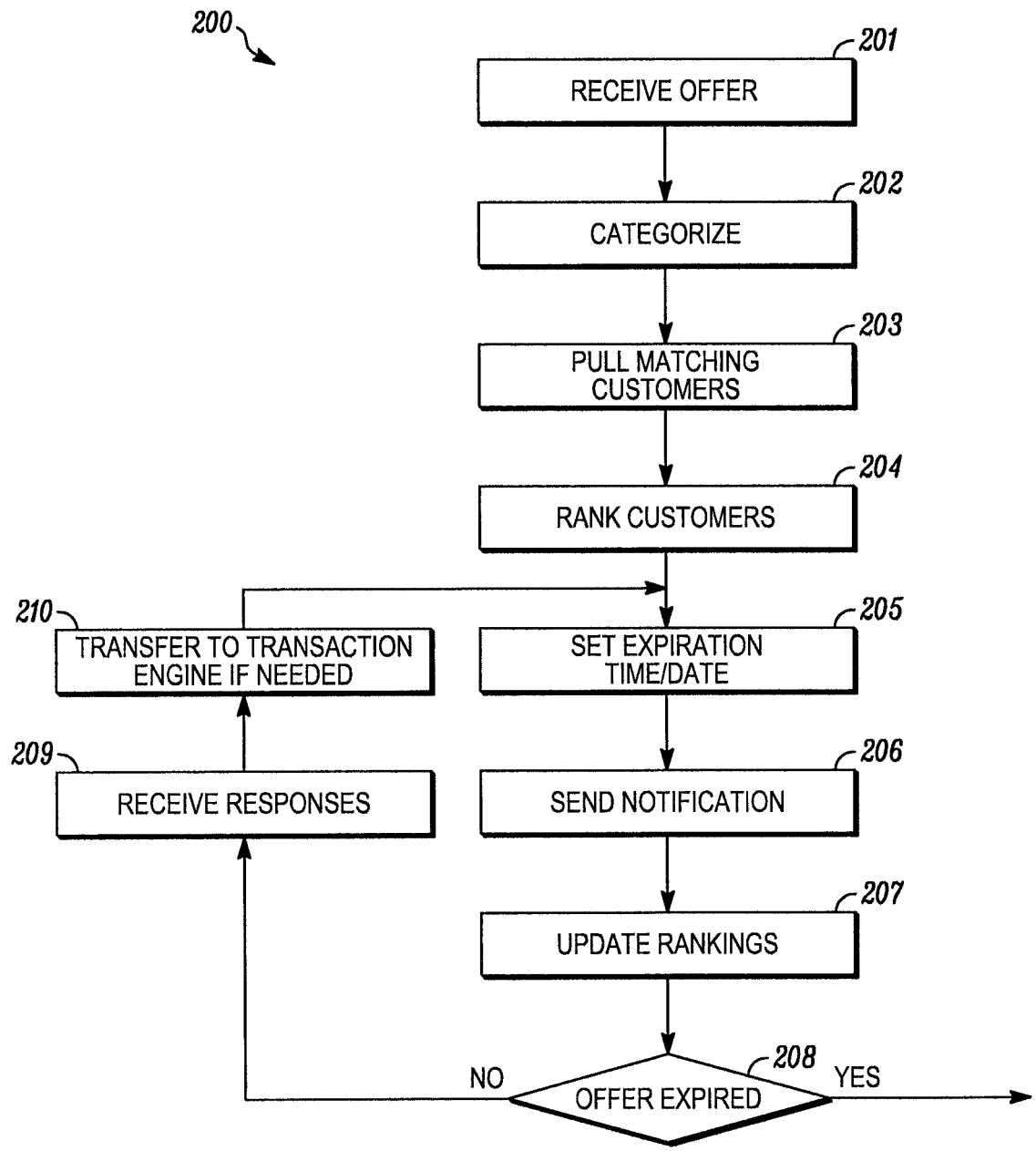
FIG. 2 is a flowchart of a method to be performed typically by computers in executing the embodiment of the invention.

FIG. 2 presents a flow diagram 200 of a typical example of transaction system activity, in accordance with one embodiment. An offer is received in process 201. In process 202, the offer is categorized. The promotion partner may categorize the offer and the system may simply accept and record the categorization, or in other cases the rules engine may categorize the offer. Process 203 pulls matching customers likely to be interested in the offer. Some examples of criteria taken into account include customers either who have indicated interest in this transaction category or who have done similar transactions in the past and whose schedule and location permit them to use the product or service. Process 204 proceeds to rank the customers, based on ranking criteria discussed above in the description of FIG. 1. The ranking may be based on rules requested or supplied by the promotion partners offering the products and/or services, or in other cases may be based on rules of the transaction system 100.

Based on the product/service and the offer parameters, an expiration time/date is set in process 205, and then in process 206 the offer is sent out via media and channels described in FIG. 1. In process 208, the system checks to determine whether the offer has expired. If the offer has expired, the sale of the offered product/service is suspended. Expiration may be triggered by an event, for example such as a flight leaving (respectively closing of check-in), or in other cases, the product may have been sold and is no longer available. If the offer has not expired, the product or service is still available. In process 209, responses are checked, and in process 210, responses are transferred to the transaction engine 121 for further processing. Accordingly, a new set of expiration times may be issued. For example, one hour before a flight the system may start sending out messages, giving top-ranked customers a five or ten minute window to respond. If no customers respond within that window, the offer may then be sent to the next lower ranked group of customers.

The processes described above can be stored in a memory of a computer, system, or machine as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in them selves recite only those features regarded as essential to the invention.

The invention claimed is:

1. A computer implemented method comprising:
receiving, via a computing device, an offer that has an explicit or implicit expiration;
determining, via a set of instructions executed on a machine, a likelihood of accepting the offer for each of a plurality of customers, the likelihood being determined by applying predetermined rules based on the characteristics of the offer and information on customers;
selecting a set of customers from the plurality of customers based on the likelihood of accepting the offer and predetermined criteria;
ranking the selected customers based on the likelihood of accepting the offer; and
sequentially providing the offer to at least one or more of the selected customers in the order of the ranking via one of a plurality of various transmission media which is selected based on a customer interest threshold.

2. The method of claim 1, further comprising guaranteeing availability of the offer to the one or more selected customers by limiting the offer to a number of customers matching a number of products or services available.

3. The method of claim 1, further comprising providing a next customer in the sequence the offer when the offer expires for or is rejected by the at least one of the selected customers.

4. The method of claim 1, wherein the offer is for a product or service concerning at least one of travel, lodging, entertainment, and dining.

5. The method of claim 1, further comprising categorizing the offer into a predetermined category.

6. The method of claim 1, wherein the information on customers comprises at least one of personal information, declared preferences, calendar information, current variables, and prior history.

7. The method of claim 1, wherein the implicit expiration of the offer is related to an event.

8. The method of claim 6, wherein the current variables comprise at least one of current locations, current financial status, current calendar status, and information gleaned from current purchases to determine current location.

9. The method of claim 1, wherein the determining a likelihood of accepting the offer for each of a plurality of customers comprises comparing features of the offer with at least one preference a customer has designated for receiving an offer and a customer's previous acceptance rate for similar offers.

10. The method of claim 1, wherein the selecting a set of customers from the plurality of customers is based on at least one of loyalty bonus, previous dollars spent by a customer, and loyalty points accrued by a customer.

11. The method of claim 1, wherein the sequentially providing the offer to at least one or more of the selected customers in the order of the ranking comprises providing the offer via at least one of email, short message service, instant messaging, telephonic media, a personalized television ad, and a personalized website ad.

12. The method of claim 1, further comprising ranking multiple offers for a customer based on at least one of a declared preference of the customer and prior purchasing history of the customer.

13. The method of claim 12, further comprising providing less than all the multiple offers based on the ranking of the multiple offers.

14. A non-transitory tangible computer readable medium that provides instructions that when executed by a machine will cause said machine to perform operations comprising:
receiving, via a computing device, an offer that has an explicit or implicit expiration;
determining a likelihood of accepting the offer for each of a plurality of customers, the likelihood being determined by applying predetermined rules based on the characteristics of the offer and information on customers;
selecting a set of customers from the plurality of customers based on the likelihood of accepting the offer and predetermined criteria; and
ranking the selected customers based on the likelihood of accepting the offer;
sequentially providing the offer to at least one or more of the selected customers in the order of the ranking via one of a plurality of various transmission media which is selected based on a customer interest threshold.

15. The tangible computer readable medium of claim 14, further comprising guaranteeing availability of the offer to the one or more selected customers by limiting the offer to a number of customers matching a number of products or services available.

16. The tangible computer readable medium of claim 14, further comprising providing a next customer in the sequence the offer when the offer expires for or is rejected by the at least one of the selected customers.

17. The tangible computer readable medium of claim 14, wherein the offer is for a product or service concerning at least one of travel, lodging, entertainment, and dining.

18. The tangible computer readable medium of claim 14, further comprising categorizing the offer into a predetermined category.

19. The tangible computer readable medium of claim 14, wherein the information on customers comprises at least one of personal information, declared preferences, calendar information, current variables, and prior history.

20. The tangible computer readable medium of claim 14, wherein the implicit expiration of the offer is related to an event.

21. The tangible computer readable medium of claim 19, wherein the current variables comprise at least one of current locations, current financial status, current calendar status, and information gleaned from current purchases to determine current location.

22. The tangible computer readable medium of claim 14, wherein the determining a likelihood of accepting the offer for each of a plurality of customers comprises comparing features of the offer with at least one preference a customer has designated for receiving an offer and a customer's previous acceptance rate for similar offers.

23. The tangible computer readable medium of claim 14, wherein the selecting a set of customers from the plurality of customers is based on at least one of loyalty bonus, previous dollars spent by a customer, and loyalty points accrued by a customer.

24. The tangible computer readable medium of claim 14, wherein the sequentially providing the offer to at least one or more of the selected customers in the order of the ranking comprises providing the offer via at least one of email, short message service, instant messaging, telephonic media, a personalized television ad, and a personalized website ad.

25. The tangible computer readable medium of claim 14, further comprising ranking multiple offers for a customer based on at least one of a declared preference of the customer and prior purchasing history of the customer.

26. The tangible computer readable medium of claim 25, further comprising providing less than all the multiple offers based on the ranking of the multiple offers.

27. A computer system comprising
at least one server configured for:
receiving, via a computing device, an offer that has an explicit or implicit expiration;
determining a likelihood of accepting the offer for each of a plurality of customers, the likelihood being determined by applying predetermined rules based on the characteristics of the offer and information on customers;
selecting a set of customers from the plurality of customers based on the likelihood of accepting the offer and predetermined criteria;
ranking the selected customers based on the likelihood of accepting the offer; and
sequentially providing the offer to at least one or more of the selected customers in the order of the ranking via one of a plurality of various transmission media which is selected based on a customer interest threshold.

28. The computer system of claim 27, further comprising guaranteeing availability of the offer to the one or more selected customers by limiting the offer to a number of customers matching a number of products or services available.

29. The computer system of claim 27, further comprising providing a next customer in the sequence the offer when the offer expires for or is rejected by the at least one of the selected customers.

30. The computer system of claim 27, wherein the offer is for a product or service concerning at least one of travel, lodging, entertainment, and dining.

31. The computer system of claim 27, further comprising categorizing the offer into a predetermined category.

32. The computer system of claim 27, wherein the information on customers comprises at least one of personal information, declared preferences, calendar information, current variables, and prior history.

33. The computer system of claim 27, wherein the implicit expiration of the offer is related to an event.

34. The computer system of claim 32, wherein the current variables comprise at least one of current locations, current financial status, current calendar status, and information gleaned from current purchases to determine current location.

35. The computer system of claim 27, wherein the determining a likelihood of accepting the offer for each of a plurality of customers comprises comparing features of the offer with at least one preference a customer has designated for receiving an offer and a customer's previous acceptance rate for similar offers.

36. The computer system of claim 27, wherein the selecting a set of customers from the plurality of customers is based on at least one of loyalty bonus, previous dollars spent by a customer, and loyalty points accrued by a customer.

37. The computer system of claim 27, wherein the sequentially providing the offer to at least one or more of the selected customers in the order of the ranking comprises providing the offer via at least one of email, short message service, instant messaging, telephonic media, a personalized television ad, and a personalized website ad.

38. The computer system of claim 27, further comprising ranking multiple offers for a customer based on at least one of a declared preference of the customer and prior purchasing history of the customer.

39. The computer system of claim 38, further comprising providing less than all the multiple offers based on the ranking of the multiple offers.

* * * * *